No. 866,020. PATENTED SEPT. 17, 1907.
J. M. HANSEN.
METHOD OF FORGING CAR AND LIKE WHEELS.
APPLICATION FILED MAY 19, 1906.

3 SHEETS—SHEET 1.

WITNESSES.
INVENTOR.

No. 866,020. PATENTED SEPT. 17, 1907.
J. M. HANSEN.
METHOD OF FORGING CAR AND LIKE WHEELS.
APPLICATION FILED MAY 19, 1906.

3 SHEETS—SHEET 2.

WITNESSES.

INVENTOR.

No. 866,020. PATENTED SEPT. 17, 1907.
J. M. HANSEN.
METHOD OF FORGING CAR AND LIKE WHEELS.
APPLICATION FILED MAY 19, 1906.

3 SHEETS—SHEET 3.

WITNESSES.
J. R. Killen
Robert C. Totten

INVENTOR.
John M. Hansen
By Kay Totten & Winter
attorneys

UNITED STATES PATENT OFFICE.

JOHN M. HANSEN, OF PITTSBURG, PENNSYLVANIA, ASSIGNOR TO FORGED STEEL WHEEL COMPANY, OF PITTSBURG, PENNSYLVANIA, A CORPORATION OF PENNSYLVANIA.

METHOD OF FORGING CAR AND LIKE WHEELS.

No. 866,020.

Specification of Letters Patent.

Patented Sept. 17, 1907.

Application filed May 19, 1906. Serial No. 317,733.

*To all whom it may concern:*

Be it known that I, JOHN M. HANSEN, a resident of Pittsburg, in the county of Allegheny and State of Pennsylvania, have invented a new and useful Improvement in Methods of Forging Car and Like Wheels; and I do hereby declare the following to be a full, clear, and exact description thereof.

My invention relates to the manufacture of forged steel car and similar wheels. Its object is to produce wheels of this character by a few die-forging steps, by which the wheel can be produced with little or no scrap, and in such way that the metal is compressed and condensed to obtain maximum strength and wearing qualities especially in the tread and hub portions.
In the practice of the invention a suitable heated blank, preferably of larger diameter than the finished wheel, is die-forged in such way as to force the metal which is displaced by thinning the web portion inwardly into the hub portion and by suitable subsequent forging producing the hub portion. In producing the tread of the wheel the blank is brought to substantially bowl-shape, and the annular tread forming portion so obtained is subsequently up-set by forcing the metal backwardly and inwardly to form the tread, and center it with reference to the web, and then force it outwardly to develop the flange. In following these main steps of the invention the metal in each step is compressed and condensed as distinguished from being drawn out, and flaws in the metal are thus closed up and obliterated, while the steel in the different parts of the wheel receive the necessary compression and working to develop the fiber structure necessary for great strength and wearing qualities.

Figure 6:
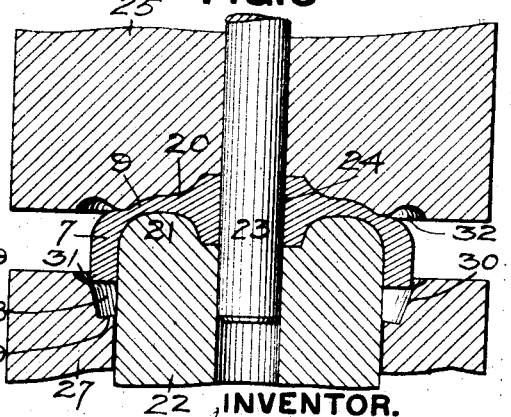
Figure 7:
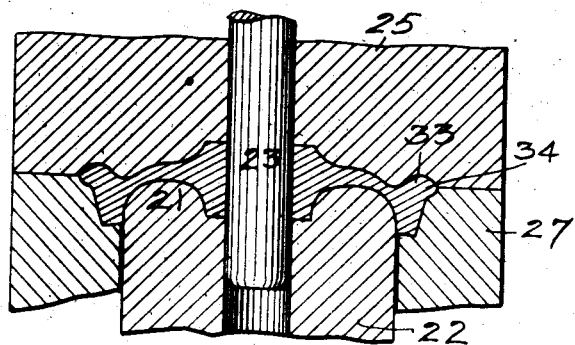
Figure 10:
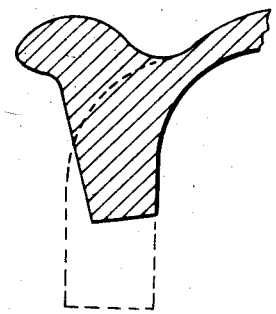
Figure 8:
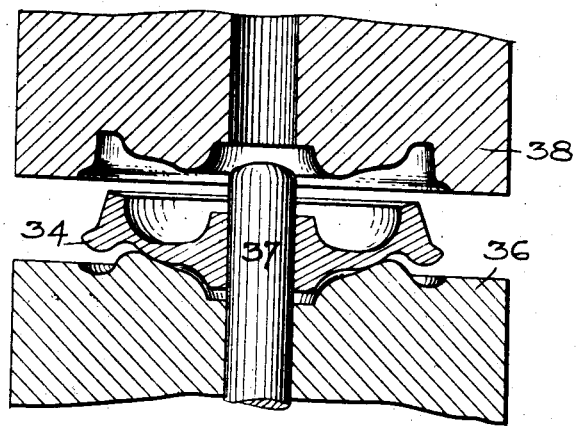
Figure 11:
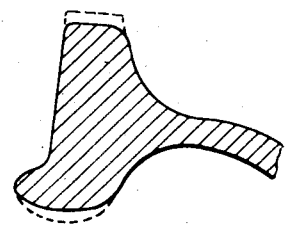
Figure 9:
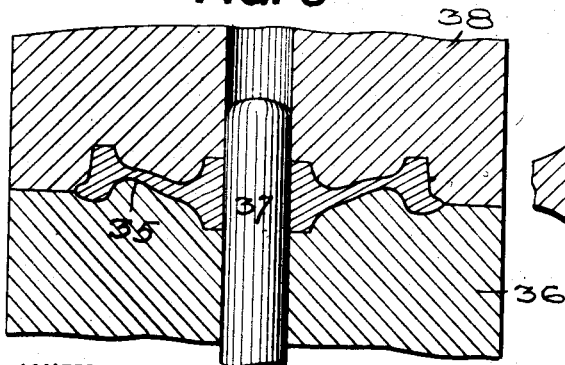
Figure 12:
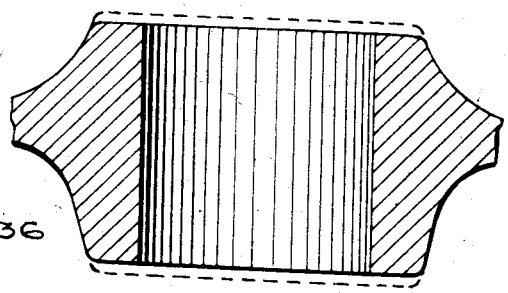
Figure 13:
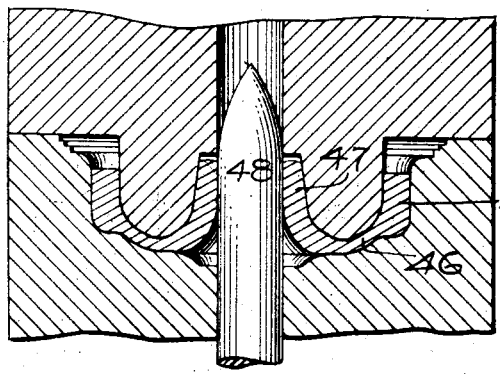
Figure 16:
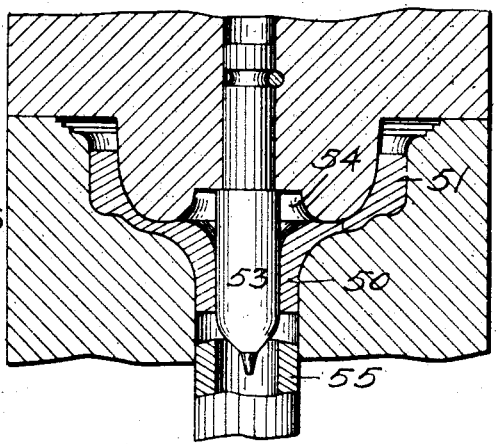
Figure 14:
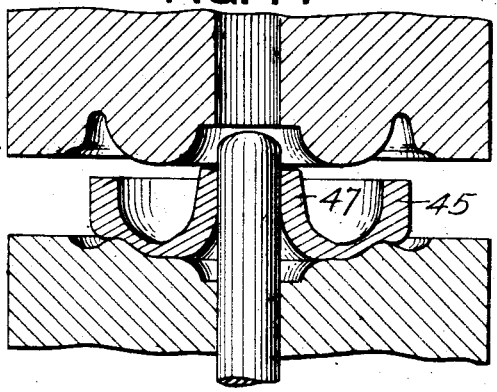
Figure 17:
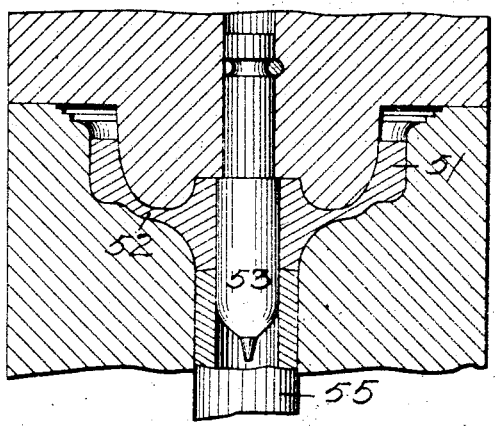
Figure 15:
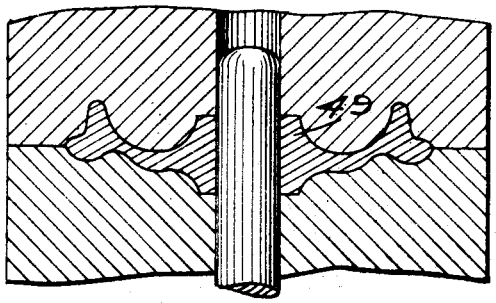

In the accompanying drawings Figures 1, 2, 3, 4 and 5 are sectional views showing different positions of the dies in the first forging operation; Figs. 6 and 7 illustrate the operation of forging the blank so produced to form the tread and flange; Figs. 8 and 9 illustrate the operation of dishing and setting the wheel and further compressing the tread and flange; Fig. 10 is an enlarged view showing in full lines the result of forging the tread and flange in the dies of Figs. 6 and 7, and in dotted lines the tread forming portion produced in the dies of Figs. 1 to 5; Fig. 11 is a like view showing in full lines the completed tread and flange and in dotted lines the tread produced in the dies of Figs. 6 and 7, indicating the metal compressed into the tread in the last forging operation; Fig. 12 is a like view of the hub portion showing in full lines the hub as produced in the dies in Figs. 6 and 7, and in dotted lines the hub as produced by the dies of Figs. 1 to 5; Fig. 13 is a sectional view of another set of dies for the formation of the bowl-shaped blank according to this invention; Fig. 14 is a view of dies suitable for forming the tread and hub portions of this blank; Fig. 15 shows said dies as closed completing said forging operation; Figs. 16 and 17 are sectional views of another set of dies suitable for forging the original blank.

As illustrated in the drawings the invention may be practiced with a variety of sets of dies, three somewhat different sets of dies suitable for the purpose being illustrated, though all of them embody the same main features, as here after shown. These dies can be mounted in any suitable power press, such for example as a hydraulic press having the necessary movements for the operation of the die parts, it being preferred that both the upper and lower portions of the dies shall have one or more movements to give the desired forging or compression strokes. It is not considered necessary to illustrate in detail the press or other die-actuating mechanism.

The preferred specific method is illustrated in Figs. 1 to 7, and I will describe the same in connection with the different steps of the method followed. In carrying out the same a suitable blank 1 is raised to a proper forging heat and is placed upon the bottom die 2, being centered thereon in any suitable way, such for example as by means of a series of grooves or steps 3 on said bottom die 2. The main upper die 4 is then brought down by the press for the first forging step. The bottom or female die 2 has the bowl-shaped cavity 5 and the upper die 4 has the annular web-forming projection 6, so that as the upper die comes down upon the blank it forges the blank into bowl shape, turning the annular tread forming portion 7 thereof upwardly, its position being generally substantially parallel to the axis of the blank.

Figure 1:
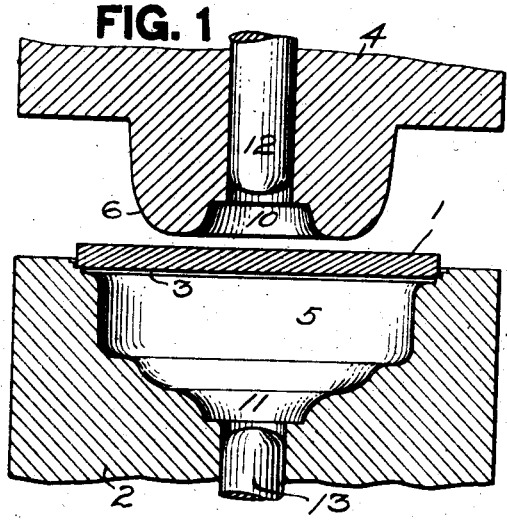
Figure 2:
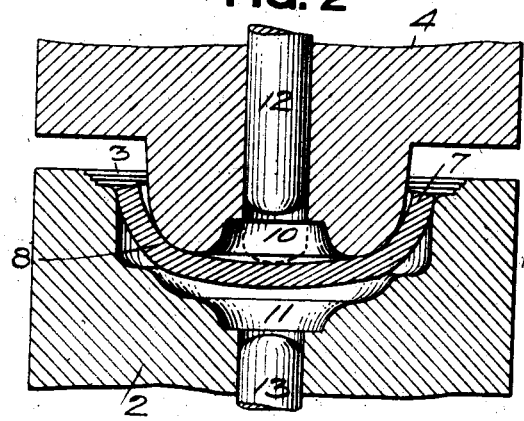
Figure 3:
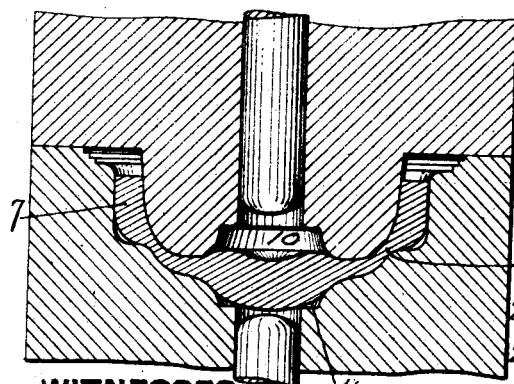
Figure 4:
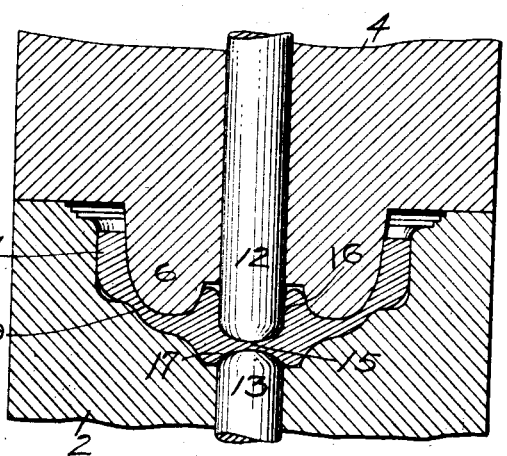
Figure 5:
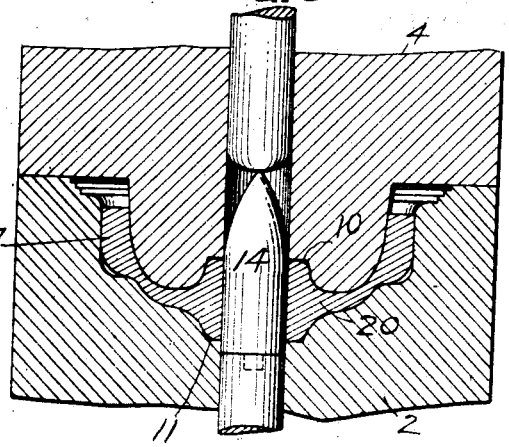

In this stroke the cheeks of the annular projection 6 of the upper die are the first to engage with the flat blank, and as they press it down into the bowl-shaped cavity of the lower die the first pressing action comes upon the metal near the outer portion of the web section of the blank, as at 8, Figs. 2 and 3. As a result of this, in the first compressing stroke (Fig. 3) the metal in the web portion of the blank is caused to flow inwardly into the hub cavities 10 and 11 of the two dies, forming the thinned web portion 9, the metal thus displaced in thinning the web portion being utilized for developing the hub portion of the blank, as illustrated in Fig. 3. In this stroke I prefer to bring the web portion of the blank to practically finished thickness, forcing nearly all the surplus or displaced metal inwardly to form the hub and holding the same in such manner as to prevent backward flow in the subsequent steps in the development of the blank. This is made practicable because of the gripping of the blank by the dies on annular lines near the outer web-forming portions of those dies and the forcing of the metal inwardly in the subsequent descent of the dies. The next step in the operation consists in spreading the metal in the central portion of the hub by displacing it outwardly, shown in Fig. 4, this being accomplished by the advancement of the upper and lower blunt end piercing punches 12 and 13, which are forced from both above and below nearly through the central portion of the blank when its web portion 9 is held as above described. As the metal is held from outward flow by the web forming portions of the dies, the displaced metal is forced by these punches outwardly into the hub forming portions 10 and 11 of the dies, as illustrated in said Fig. 4. It is found that by these punching strokes the hub forming cavities 10 and 11 are almost filled by the metal displaced. If desired the upper central punch 12 may descend with the upper die 4, and the lower punch 13 be raised after the completion of the stroke of the die 4 and punch 12, this giving practically the same result, and being also illustrated in Fig. 4. The next step in the forming of the blank is the piercing thereof, shown in Fig. 5, and for the purpose the lower punch 13 is lowered by the ram controlling the same and for said punch 13 I substitute a sharp piercing mandrel 14 and force said piercing mandrel upwardly through the blank, said mandrel piercing the central web 15 between the depressions 16 and 17 formed by the punches 12 and 13, and causing the metal to flow longitudinally and spreading it outwardly within the hub cavities 10 and 11 of the dies and so practically completing the development of the hub portion. Instead of using the lower punch 13 the piercing mandrel 14 may be employed, being first partially raised corresponding to the down stroke of the punch 12, and then forced through the blank. It will thus be observed that I am enabled to provide sufficient metal for developing the thick or deep hub, first by the displacement and forcing inwardly of the surplus metal obtained in thinning the web, as in Fig. 3; next, by forcing the metal in the center of the hub portion of the blank outwardly, as in Fig. 4; and finally, by further spreading it by piercing the blank, no metal being lost or wasted. In this manner the metal is continuously worked under compression, and a great saving in metal is effected. In developing this bowl-shaped blank I prefer to employ an initial blank 1 of greater diameter and thinner than the finished wheel, and by these steps, as well as by the subsequent steps of the method, to condense and compress it, always forcing the metal inwardly to develop the hub and forcing the center of the hub forming portion of the blank outwardly and longitudinally so as to thicken the hub portion of the blank and condense the metal therein. I may, however, employ a blank somewhat thicker and of smaller diameter, and in so doing, in forming the web, provide more metal for forcing into the hub portion, while at the same time, if necessary, thinning to some extent the periphery or tread forming portion 7 of the blank and forcing it upwardly to provide all metal necessary for the subsequent development of the tread.

It will be noticed that the concavo-convex or bowl-shaped blank has its thin web portion 9 connected to the tread forming portion 7 by a gradual curve. This is the preferred form of blank obtained by the first forging operation, first, because in the forging thereof from the original slab liability to cracking of the outer portion of the blank is overcome through the combined thinning and curving of the blank at the point where the greatest bend occurs, and such form is therefore adapted to prevent fracture of the metal; and second, because in the second or forging operation by having the web portion connected to the tread portion on curved lines, liability to buckling or folding in forming the tread is overcome.

The bowl-shaped blank 20, produced in the manner above described, is preferably re-heated, and is subjected to further die-forging steps to develop the tread and if necessary compress the hub of the wheel. By the term "tread" I of course include the formation of the rim of any wheel to which the method of manufacture herein described is applicable. For this purpose I prefer to invert the blank 20, as shown in Fig. 6, the inverted bowl resting upon the annular convex portion 21 of the central lower die 22, and the central mandrel 23 passing downwardly through the eye 24 of the blank 20. The lower die 22 is then raised, forcing the blank upwardly against the upper die 25 and clamping the web portion 9 of the blank, somewhat reforming it but preferably not materially reducing the metal thereof, the previously developed hub portion of the blank being further compressed if necessary to form and condense the same around the mandrel 23, as illustrated in Fig. 12. While so clamped the tread-forming portion 7 of the blank is upset to form the tread and its flange and center the tread with relation to the web. This is accomplished by means of the annular ring or die 27 fitting around the central lower die 22, which die is raised, as shown in Fig. 7, to force the tread forming portion 7 upwardly and die-forge the tread and flange to shape. This ring die 27 has the cavity 28 provided with the base face 29, the inclined tread forming face 30 and the flaring flange forming face 31, such annular cavity coöperating with the annular depression or cavity 32 formed in the upper die 25 to forge the tread and its flange, as shown in Figs. 7 and 10. It will be noticed that the tread-forming portion of the bowl-shaped blank is thicker than the annular tread forming cavity 28, so that in this die-forging operation the metal is first forced inwardly toward the web portion of the blank, thus bringing great pressure and work upon the tread-forming portion 7 of the blank and acting with great pressure upon the tread face so as to highly compress the same, and causing the metal to flow inwardly toward the axis of the blank to fill the flange-forming cavity formed by the flaring face 31 of the ring die 27 and the annular depression 32 of the upper die 25, so first compressing the metal to form the head 33 and then spreading it somewhat to develop the flange portion 34 of the tread. In this stroke the tread is also centered with relation to the web, bringing the different parts of the blank to approximately finished shape and distributing the metal properly throughout the entire blank. In this second die-forging step, however, the tread is left thicker or deeper than in the finished wheel in order to provide metal for further condensing and forcing into the tread when the blank has cooled and to increase the compression or work thereon.

To complete the die forging of the wheel the next die-forging step gives to the web portion its proper reverse curve, as at 35, and further compresses and works the tread and flange portions, and finally locates the tread with proper relation to the hub. For this purpose the dies shown in Figs. 8 and 9 are employed. The blank formed by the die-forging operation in the dies of Fig. 7 is placed upon the lower die 36, the mandrel 37 being inserted within the hub eye and the die 38 being forced down upon the blank as shown. This final die-forging step is intended principally to act upon the tread and flange of the blank, the work done thereon being approximately illustrated in Fig. 11, where the tread and flange portion of the finished wheel are shown in full lines and the extra metal forced and condensed into the tread portion is indicated in dotted lines. This final compressing stroke takes place without further reheating of the blank and after the blank has cooled sufficiently to cause great compression and condensation of the tread and flange portions when at a low temperature, and in this way to densify and harden both these portions of the finished wheel, thereby obtaining the beneficial effects resultant from working the metal at a low temperature and fully developing the fiber structure of the tread portion of the wheel, so obtaining a smooth finished tread and flange having hardened wearing faces. This final die-forging step operates simultaneously over the entire tread and flange of the wheel, giving a much greater compression and condensation than possible where only a portion thereof is operated thereon at a time, as in rolling dies. The die-forging step operates principally upon the tread and flange portion of the wheel and by confining and compressing the entire tread and flange at one time gives great density and hardness to the wearing faces thereof. The only finishing of the wheel necessary is in the trimming of the eye and the removal of any flash or fin formed in the die-forging of the wheel.

It will thus be seen that I produce by a few die-forging steps and with practically no loss of metal a very strong forged steel wheel, and that in so doing the metal is under compression at practically all times, first in the formation of the web where the metal thereof is forced inwardly to aid in developing the hub, next, in the outward displacement of the central portion of the metal and in the piercing of said hub portion to further compress and condense the metal and finally in the upsetting of the tread portion of the blank, so that any flaws or blow-holes in the blank are practically obliterated because the different die forging steps provide for the formation of all parts of the wheel under compression as distinguished from the stretching usual in the rolling of parts of the wheel, and that in the final step the tread and flange are subjected to such a heavy pressure as insures the condensation of the metal and the proper distribution of the fiber structure to give wearing qualities and strength to the wheel.

It will be observed that the eye of the hub is formed by a piercing operation, that is, by the action of suitable piercing mandrels which displace the position of the metal but without removing the same, as distinguished from a punching operation wherein a portion of the metal is entirely removed. The metal displaced by the piercing operation is forced both outwardly and longitudinally of the axis of the blank, thus not only developing the hub portion of the wheel but also producing by this action a denser and more solid hub. At the same time the scrap which would be produced by punching out a portion of the metal is avoided.

It is evident that the invention can be followed by any suitable specific steps and in any suitable dies embodying the general principles above described. I have illustrated two other forms of dies for this purpose and will give a brief description thereof: In Fig. 13 I employ practically the same steps for developing the bowl-shaped blank, by which practically the same tread portion 45 is formed and the web portion 46 is partially or entirely developed, while the hub forming portion 47 is formed first by forcing the metal longitudinally in one direction, such, for example, as by piercing with the piercing mandrel 48. The hub forming portion 47 as shown in said figure is forced in the same direction as the annular tread forming portion 45. This blank so formed can then be re-heated and subjected to the dies shown in Figs. 14 and 15, by which the hub forming portion is upset backwardly to develop the hub 49, while at the same time the tread forming portion 45 is upset to develop the tread and flange and center the same with relation to the web as above described, and if necessary the web is thinned and brought to finished thickness the metal thereof being forced inwardly into the hub portion in substantially the manner above described. The third and final operation is the same as that described in connection with Figs. 8 and 9.

In Figs. 16 and 17 I have illustrated the formation of the hub portion 50 by piercing the same by means of the central piercing mandrel 53 and forcing it longitudinally in the opposite direction to that shown in Fig. 13, that is, forcing the hub forming portion in the opposite direction to the tread-forming portion 51. After the piercing operation, while held in the same dies, this hub forming portion is upset and forced back into the hub forming cavity 54 by the annular follower die 55 fitting around the piercing mandrel 53, to practically complete the formation of the hub. In the said dies the tread forming portion 51 and the web forming portion 52 are preferably of the same form as above described, and in the forging of the bowl-shaped blank the surplus metal of the web is forced inwardly to aid in developing the hub. The blank so formed is then reheated and can be brought to finished shape by the second and third operations described above in connection with the preferred practice, as illustrated in Figs. 6 to 9.

The claims are intended to cover the reduction of the web portion either in one die forging operation, which is illustrated in Figs. 1 to 8, or in two die forging operations, as illustrated in Figs. 13 to 15, and the formation of the hub portion either in one die forging operation, as shown in Figs. 1 to 8, and in Figs. 16 and 17, or in two die forging operations as shown in Figs. 13 to 15.

What I claim is:

1. The improvement in the art of forming forged steel car and like wheels, consisting in so die-forging an imperforate heated blank as to reduce the web portion in thickness and force the displaced metal inwardly toward, and longitudinally of, the axis of the blank to aid in developing the hub portion.

2. The improvement in the art of forming forged steel car and like wheels, consisting in annularly compressing a heated blank by pressure acting first near the outer portion of the web and then proceeding toward the center of the blank and thereby causing the displaced metal to flow inwardly and aid in forming a thickened hub portion.

3. The improvement in the art of forming forged steel car and like wheels, consisting in so die-forging a heated blank as to reduce the web portion in thickness and force the displaced metal inwardly to aid in developing the hub portion, and while confining the web portion piercing the hub portion and thereby forcing the metal longitudinally of the axis of the blank.

4. The improvement in the art of forming forged steel car and like wheels, consisting in so die-forging a heated blank as to thin the web portion thereof and force the displaced metal inwardly to aid in forming the hub portion, and while confining the web portion so formed, compressing the hub portion centrally and thereby spreading the metal thereof to aid in forming the hub.

5. The improvement in the art of forming forged steel car and like wheels, consisting in so die-forging a heated blank as to thin the web portion thereof and force the displaced metal inwardly to aid in forming the hub portion; and while confining the web portion so formed compressing the hub portion centrally and thereby spreading the metal thereof to aid in forming the hub, and then piercing the hub portion.

6. The improvement in the art of forming forged steel car and like wheels, consisting in so die-forging a heated blank as to reduce the web portion in thickness and force the displaced metal inwardly to aid in developing the hub portion, and subsequently, while confining the web portion, piercing the central hub portion of the blank and compressing it longitudinally.

7. The improvement in the art of forming forged steel car and like wheels, consisting in so die forging a heated blank as to reduce the web portion in thickness and force the displaced metal inwardly and thicken the central portion of the blank on both sides thereof and so aid in developing the hub portion.

8. The improvement in the art of forming forged steel car and like wheels, consisting in so die forging a heated blank as to thin the web portion thereof and force the displaced metal inwardly to aid in forming the hub portion, and subsequently indenting the hub portion of the blank centrally on both sides to further develop the hub portion.

9. The improvement in the art of forming forged steel car and like wheels, consisting in producing by die forging a bowl-shaped blank having a central projection, piercing said projection and spreading the metal therein, and subsequently compressing the annular central projection so formed longitudinally of the axis of the blank to form the hub portion of the wheel.

10. The improvement in the art of forming forged steel car and like wheels, consisting in producing by die forging a bowl shaped blank having a thinned web portion and a thicker rim forming portion, and subsequently while confining the web portion up-setting the annular rim forming portion to form the rim of the wheel.

11. The improvement in the art of forming forged steel car wheels, consisting in producing by die forging a bowl-shaped blank having a thinned web portion and a thicker tread-forming portion, and subsequently while confining the web portion applying up-setting pressure to the tread-forming portion to condense the tread and spread the flange.

12. The improvement in the art of forming forged steel car wheels, consisting in developing by die-forging a blank having web and tread-forming portions, and then, while confining the web portion, subjecting the tread-forming portion for its entire periphery to direct pressure applied in part to condense the metal toward the axis of the blank and form the tread face and applied in part to spread the metal and develop the flange.

13. The improvement in the art of forming forged steel car wheels, consisting in producing a blank having a web portion of substantially finished thickness and a thicker tread forming portion, and then confining said web portion and subjecting the tread forming portion for its entire periphery to direct pressure acting against the metal and toward the axis of the blank to form the tread of the wheel.

14. The improvement in the art of forming forged steel car and like wheels, consisting in producing by die forging a bowl-shaped blank having a thinned web portion and a thicker rim-forming portion, and subsequently while confining said web portion subjecting the rim-forming portion for its entire periphery to direct pressure acting against the metal and toward the axis of the blank to form the rim of the wheel.

15. The improvement in the art of forming forged steel car wheels, consisting in producing by die-forging a blank having hub and web portions of substantially finished shape, and a tread portion thicker than finished shape, and while confining the web portion and at a low heat up-setting the thickened tread portion to bring the tread and flange to finished shape and densify the same.

16. The improvement in the art of forming forged steel car wheels, consisting in producing by die-forging a bowl shaped blank having hub, web and tread forming portions, then while confining the web portion subjecting the tread forming portion for its entire periphery to a direct pressure acting toward the axis of the blank to upset the same and form a thickened tread and flange, and at a lower temperature subjecting said thickened tread portion to heavy pressure to bring it to finished shape and densify the same.

17. The improvement in the art of forming forged steel car wheels, which consists in so die-forging a heated blank as to produce a bowl-shaped blank having a thinned web portion and forcing the metal so displaced inwardly to assist in developing a hub portion, then subjecting the edge portion of said blank to a direct pressure to upset the same and form a thickened tread portion, and at a lower temperature subjecting said thickened portion to heavy compression to bring the tread and flange to finished shape and densify the same.

18. The improvement in the art of forming car and like wheels, consisting in producing by die forging a bowl-shaped blank having a central hub enlargement, a thinned web portion and a thicker annular rim forming portion, and subsequently while confining the web portion by the same operation up-setting the hub portion to bring it to finished shape and up-setting the rim portion to form the rim of the wheel.

19. The improvement in the art of forming car and like wheels, consisting in so forging a heated blank as to bring it to bowl-shape and thin the web portion and thereby force the displaced metal inwardly toward the hub portion, while confining the web portion piercing the hub portion and so developing a rudimentary hub, upsetting said hub portion to complete the hub, and upsetting the annular rim portion to form the rim of the wheel.

20. The improvement in the art of forming forged steel car and like wheels, consisting in heating a blank of greater diameter than the finished wheel and so shaping the same by die-forging steps as to form an integral hub, web and rim, and applying said die-forging steps in such manner as to work the metal inwardly toward the hub and thereby densify the metal and eliminate flaws.

In testimony whereof, I the said JOHN M. HANSEN have hereunto set my hand.

JOHN M. HANSEN.

Witnesses:
F. W. WINTER,
ROBERT C. TOTTEN.